United States Patent
Gage et al.

(10) Patent No.: US 7,185,440 B2
(45) Date of Patent: Mar. 6, 2007

(54) SENSING CONTACT PROBE

(75) Inventors: Edward Charles Gage, Mars, PA (US); Yiao-Tee Hsia, Wexford, PA (US); Wei Peng, Mars, PA (US); James D. Kiely, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/183,637

(22) Filed: Jul. 18, 2005

(65) Prior Publication Data

US 2007/0011899 A1  Jan. 18, 2007

(51) Int. Cl.
*G01B 7/28* (2006.01)
*G01B 7/34* (2006.01)

(52) U.S. Cl. .................................. 33/561; 33/558
(58) Field of Classification Search ............ 33/557, 33/558, 560, 561
See application file for complete search history.

(56) References Cited

U.S. PATENT DOCUMENTS

| | | | |
|---|---|---|---|
| 4,926,559 A * | 5/1990 | Knabel | 33/832 |
| 5,307,311 A | 4/1994 | Sliwa, Jr. | 365/714 |
| 5,675,531 A | 10/1997 | McClelland et al. | 365/151 |
| 5,883,705 A * | 3/1999 | Minne et al. | 355/71 |
| 5,953,306 A | 9/1999 | Yi | 369/126 |
| 6,023,103 A * | 2/2000 | Chang et al. | 257/781 |
| 6,365,895 B1 | 4/2002 | Yamamoto | 250/306 |
| 6,392,934 B1 * | 5/2002 | Saluel et al. | 365/189.01 |
| 6,477,132 B1 | 11/2002 | Azuma et al. | 369/126 |
| 6,597,639 B1 | 7/2003 | Hamann et al. | 369/13.01 |
| 6,651,351 B1 * | 11/2003 | Christoph et al. | 33/503 |
| 6,692,569 B2 | 2/2004 | Roeder et al. | 117/104 |
| 6,708,420 B1 * | 3/2004 | Flanagan | 33/556 |
| 6,712,480 B1 | 3/2004 | Leung et al. | 359/846 |
| 6,720,553 B2 | 4/2004 | Bonnell et al. | 250/252.1 |
| 6,756,795 B2 | 6/2004 | Hunt et al. | 324/701 |
| 6,826,422 B1 | 11/2004 | Modell et al. | 600/407 |
| 6,851,301 B2 | 2/2005 | Kim et al. | 73/105 |
| 6,854,648 B2 | 2/2005 | Hong et al. | 235/451 |
| 6,874,243 B2 * | 4/2005 | Hama et al. | 33/551 |
| 6,983,644 B2 * | 1/2006 | Yamanaka et al. | 73/105 |
| 2005/0052984 A1 | 3/2005 | Hong et al. | 369/126 |
| 2005/0099895 A1 | 5/2005 | Maeda et al. | 369/13.01 |

OTHER PUBLICATIONS

Zhang et al., "Laser bending for high-precision curvature adjustment of microcantilevers," Applied Physics Letters 86, 02114 (Jan. 6, 2005).

Sedky et al., "Pulsed-Laser Annealing, a Low-Thermal-Budget Technique for Eliminating Stress Gradient in Poly-SiGe MEMS Structures," pp. 669-675, Journal of Microelectronmechanical Systems, vol. 13, No. 4, Aug. 2004.

* cited by examiner

*Primary Examiner*—Christopher W. Fulton
(74) *Attorney, Agent, or Firm*—Westman, Champlin & Kelly, P.A.

(57) ABSTRACT

A sensing contact probe includes a beam support and a probe. The probe has a bent beam body that extends from the beam support to a probe tip face that has a position and faces in an angular direction. The bent beam body has first and second beam layers bonded together and have differing residual stresses that bend the beam body. A stress relief region is formed in the bent beam body. The stress relief region has an adjusted stress property that adjusts the bending to control the probe tip face position and angular direction.

20 Claims, 5 Drawing Sheets

SECTION 3-3

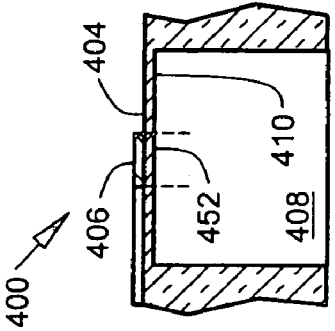
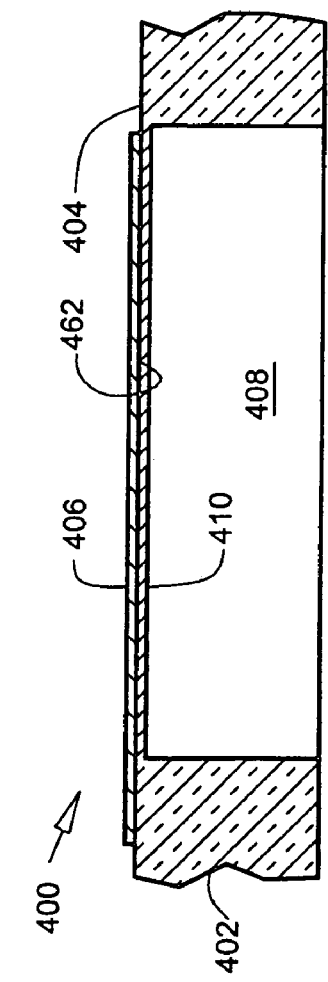
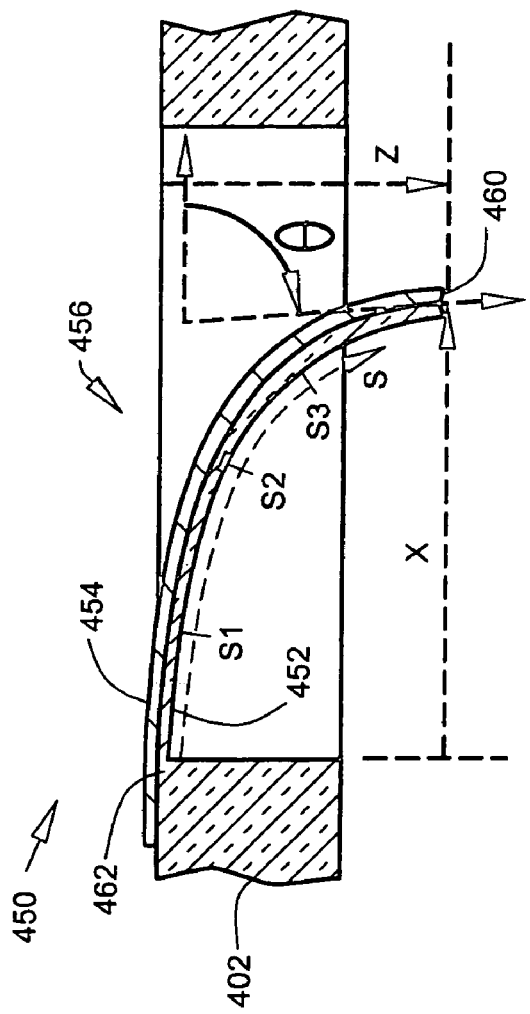

SENSING CONTACT PROBE

FIELD OF THE INVENTION

The present invention relates generally to contact probes, and more particularly but not by limitation to contact probes for use with ferroelectric memory.

BACKGROUND OF THE INVENTION

Microcantilevers are used as contact or support fingers in micromechanical devices. Microcantilevers typically have dimensions in the range of 1 to 100 micrometers and are formed by MEMS (microelectromechanical system) or MST (microsystem technology) methods. One problem with microcantilevers is that the position and angle of the end of the beam tends to be somewhat variable, and this variability is thought to be due to variations in processing conditions during fabrication which are difficult to control. The variability limits the precision with which devices which use microcantilevers can be made. A method and apparatus are needed to reduce variability in the position and angle of ends of microcantilever beams.

Embodiments of the present invention provide solutions to these and other problems, and offer other advantages over the prior art.

SUMMARY OF THE INVENTION

Disclosed is a sensing contact probe. The sensing contact probe comprises a beam support and a probe. The probe comprises a bent beam body that extends from the beam support to a probe tip face. The probe tip face is spaced apart from the beam support. The probe tip face has a position and faces in an angular direction.

The bent beam body comprises first and second beam layers that are bonded together and that have differing residual stresses that bend the beam body. A stress relief region is formed in the bent beam body. The stress relief region has an adjusted stress property that adjusts the bending to control the probe tip face position and angular direction.

In one embodiment, the first beam layer comprises an electrically insulation layer and the second beam layer comprises a metal layer that provides an electrical connection to the probe tip face.

In another embodiment, the probe tip face is a first one of a row of multiple probe tip faces suspended from a probe support that is common to the row of probe tip faces, and the adjustment of the first probe tip face brings the first probe tip face into improved alignment with the remaining multiple probe tip faces.

Other features and benefits that characterize embodiments of the present invention will be apparent upon reading the following detailed description and review of the associated drawings.

BRIEF DESCRIPTION OF THE DRAWINGS

FIGS. 4–7 illustrate process steps in manufacturing an array of sensing contact probes.

DETAILED DESCRIPTION OF ILLUSTRATIVE EMBODIMENTS

In the embodiments described below in connection with FIGS. 1–10, a sensing contact probe includes a beam body (microcantilever) that is formed of two layers that have differing residual stresses. The two layers are bonded together, and the differing amounts of residual stress bend the beam into an arc. The bent beam body serves as a spring that provides a preload force to keep a probe tip face at one end of the beam in contact with a surface that is to be scanned by the probe tip face. The sensing contact probes can be formed in arrays to provide simultaneous (parallel) scanning of multiple points on a surface. When individual beams in the array are misaligned due to manufacturing process variations, they are brought into alignment by adjusting a stress property of a stress relief region in the beam body. Lasers or chemical etching can be used to adjust the stress property. An array of beams can be brought into alignment with one another to ensure accurate placement and uniform mechanical preload on the probe tip faces. The sensing contact probes can be used in scanning information in ferroelectric memories as well as in other applications.

Figure 1:
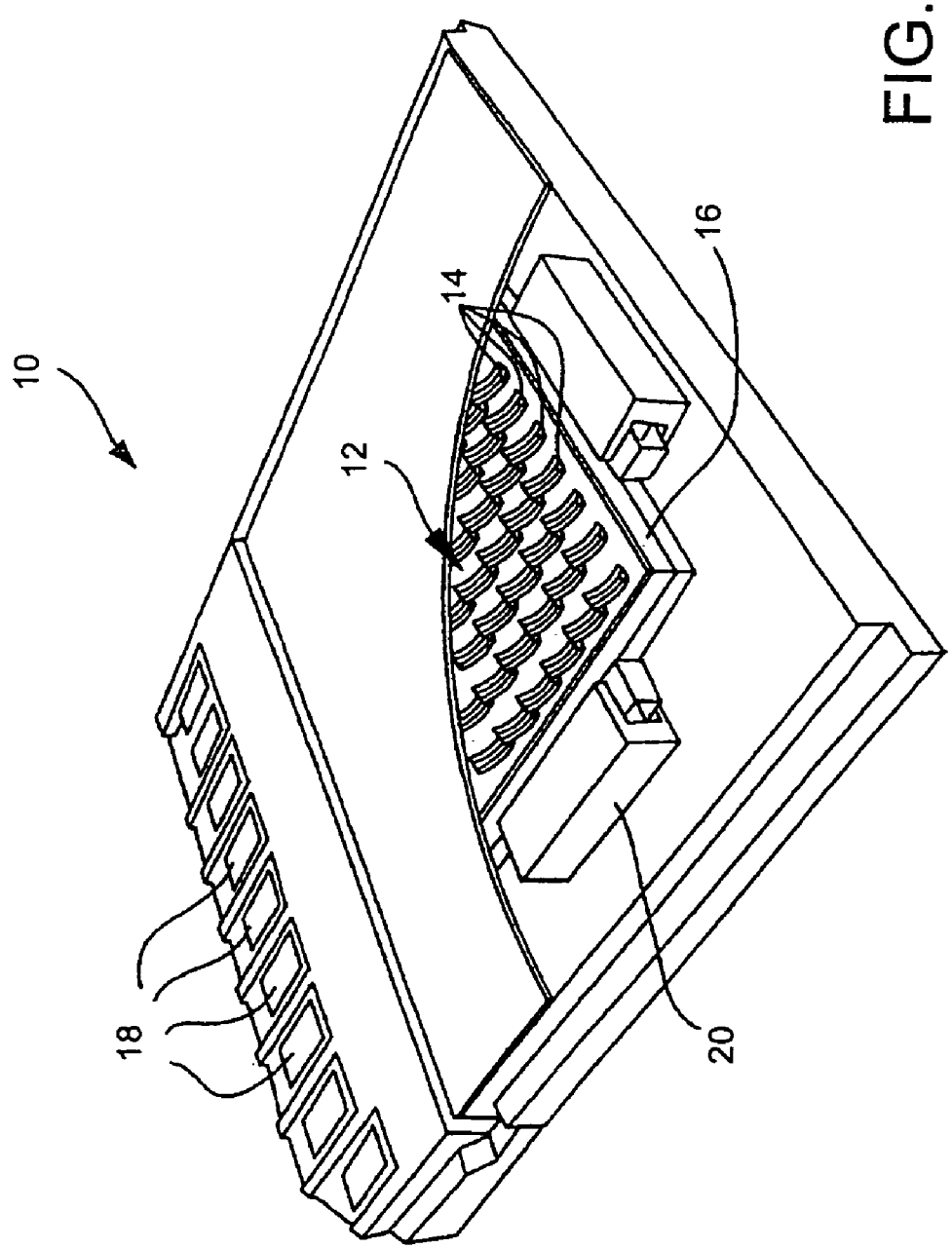
FIG. 1 illustrates a ferroelectric data storage drive.

FIG. 1 illustrates an exemplary ferroelectric data storage drive 10 in which embodiments of the invention are useful. The drive 10 comprises a ferroelectric storage medium 16 with a scanable surface 12. An array of cantilever beams 14 contact the scanable surface 12 and communicate data to and from the scanable surface 12. Microactuators such as microactuator 20 provide relative scanning motion between the scanable surface 12 and the cantilever beams 14. Electrical contacts 18 provide connections between the drive 10 and a host computer system.

Figure 2:
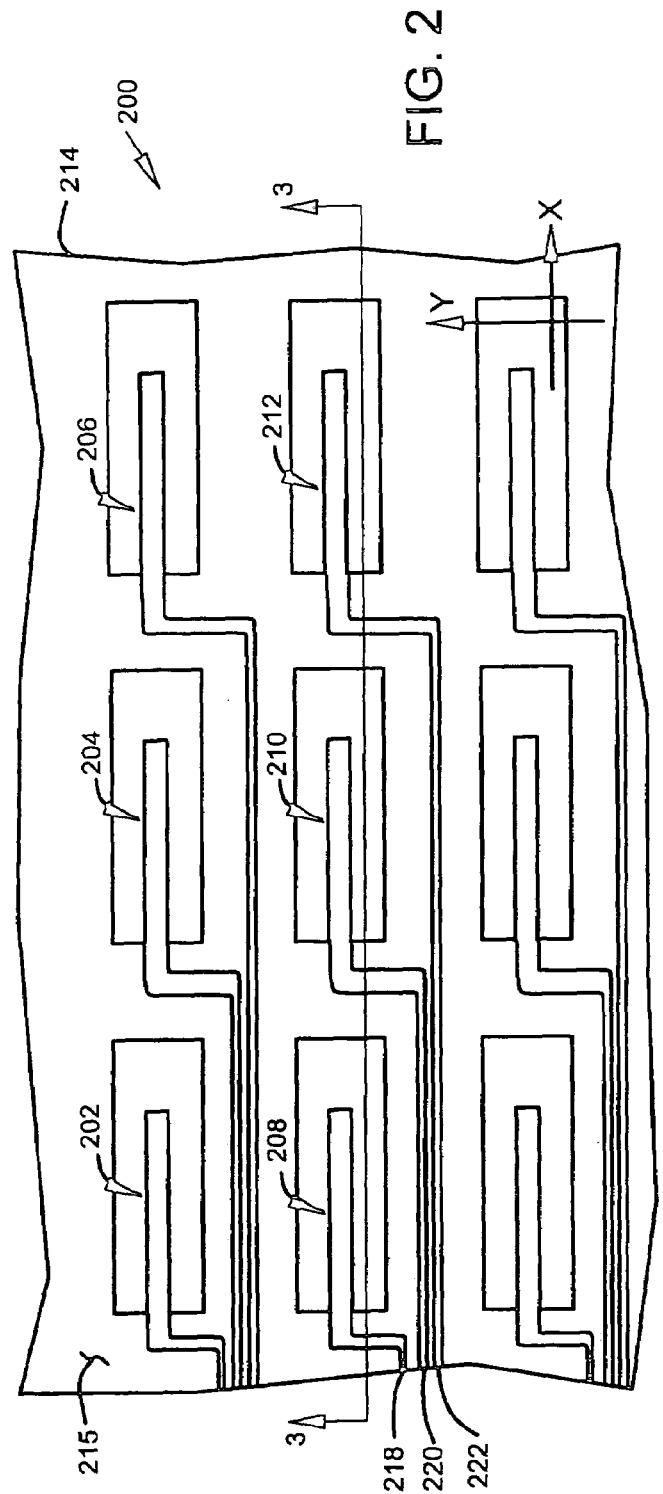
FIGS. 2–3 illustrate an array of sensing contact probes.
Figure 3:
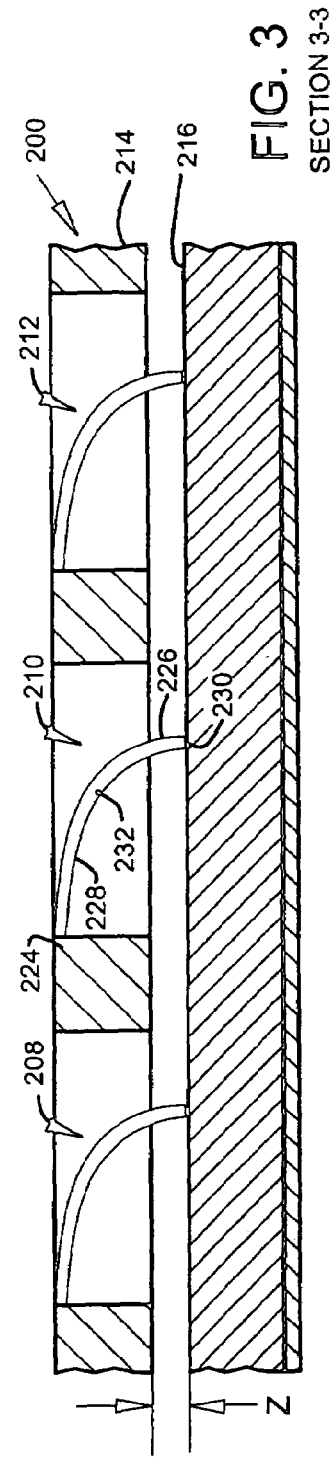

FIGS. 2–3 illustrate an array 200 of sensing contact probes 202, 204, 206, 208, 210, 212 that are formed in cavities of a substrate 214. FIG. 2 illustrates a top (plan) view of the array 200, and FIG. 3 illustrates a front cross-sectional view taken along line 3—3 in FIG. 2.

The substrate 214 provides a common beam support for the sensing contact probe 202, 204, 206, 208, 210, 212. Substrate 214 is only partially shown in FIGS. 2–3 and can extend to support a larger number of sensing contact probes that are not illustrated in FIGS. 2–3. The sensing contact probes 202, 204, 206, 208, 210, 212 are preferably arranged in a regular rectangular array, as illustrated, or in oblique alignments. The substrate 214 is movable relative to a surface 216 (FIG. 3) along X and Y axes to provide scanning of the surface 216 by the sensing contact probes 202, 204, 206, 208, 210, 212. The substrate 214 is supported at a controlled spacing Z from the surface 216. The controlled spacing Z is typically selected to provide a desired force preload magnitude between the surface 216 and each of the sensing contact probes. The preload force deflects the sensing contact probes 202, 204, 206, 208, 210, 212 so that the sensing contact probes 202, 204, 206, 208, 210, 212 preferably function as springs. Relative motion between the substrate 214 and the surface 216 can be effected by motion of the substrate 214, motion of the surface 216, or motion of both the substrate 214 and the surface 216. The controlled spacing Z can be continuously maintained, or alternatively, the controlled spacing Z can be temporarily increased during periods of rapid relative motion, or moved to "park" the substrate in a transit position in which the sensing contact probes 202, 204, 206, 208, 210, 212 do not contact the surface 216. In an exemplary application, the substrate 214 is moved along the X-axis by a first actuator (not illustrated), and the surface 216 is moved along a Y axis by a second actuator (not illustrated).

Substrate 214 and surface 216 are illustrated as flat elements in FIGS. 2–3, however, the substrate 214 and the surface 216 can have other shapes such as round cylindrical shapes. The surface 216 preferably comprises a surface of a ferroelectric memory or a magnetic memory that is accessed by the probes 202, 204, 206, 208, 210, 212. Relative motion between the substrate 214 and the surface 216 can be any suitable scanning motion such as random access scanning, raster scanning, or other known surface scanning motions or patterns. With the use of multiple probes, a large number of bits of data can be written or read simultaneously (in parallel) to provide high speed access.

Exemplary communication channels 218, 220, 222 run over a top surface 215 of the substrate 214 to carry information to and from the sensing contact probes 218, 220, 222. The communication channels 218, 220, 222 can comprise known communication channels such as electrical conductors, optical waveguides or both. The communication channels 218, 220, 222 can also be used to provide energization to the sensing contact probes 208, 210, 212. The communication channels 218, 220, 222 couple to electronic circuitry (not illustrated) that can be located on the substrate surface 215 or elsewhere.

An exemplary sensing contact probe such as sensing contact probe 210 comprises a beam support 224 (a portion of the substrate 214) and a probe 226. The probe 226 comprises a bent beam body 228 extending from the beam support 224 to a probe tip face 230 spaced apart from the beam support 224. the probe tip face 230 has a position and faces in an angular direction as described in more detail in connection with an example described below in connection with FIG. 6.

As described in more detail below in connection with FIGS. 4–7, the bent beam body 228 comprises first and second beam layers having differing residual stresses bonded together. The differing residual stresses bend the beam body. The first and second beam layers can be formed of the same material when the first and second layers are formed under different process conditions such that residual stresses in the two layers differ. Preferably, the first and second layers are formed of different material compositions, providing a large difference in residual stress.

A stress relief region 232 is formed in the bent beam body 228. The stress relief region 232 has an adjusted stress property that adjusts the bending of the bent beam body 228 to control the position and angular direction of the probe tip face 230. After the array 200 is manufactured, it may be found that one or more probe tips in the array are not optimally aligned with other probe tips in the array and thus would not contact the surface 216 with the same force and angular direction as other probe tips. As described in more detail below, misaligned sensing contact probe is brought into correct alignment by adjusting the stress property of the stress relief region 232. The stress relief region 232 can comprise a laser-ablated region, a laser-induced plastic flow region, a chemically etched region, or other known adjustable stress-relieved region.

FIGS. 4–7 illustrate process steps in manufacturing a sensing contact probe that is comparable to the sensing contact probe 210 shown in FIGS. 2–3. FIG. 4 illustrates a front cross-sectional view and FIG. 5 illustrates a side cross-sectional view of the sensing contact probe 400 at a first stage of manufacture.

In FIGS. 4–5, a substrate 402 has an upper surface 404 upon which a communication channel 406 is deposited. The communication channel 406 comprises a patterned thin film layer of tantalum that serves as an electrical conductor useful for electrically contacting a surface of a ferroelectric memory. The substrate 402 comprises a layer of alumina. The tantalum thin film layer 406 can be patterned using any suitable known method of MEMS lithography. The thickness of the tantalum thin film 406 is preferably on the order of about 0.5 micrometers.

After completion of the deposition process, the tantalum thin film 406 is in a state of residual mechanical stress along lines parallel to the upper surface 404, with or without biaxial stress. A portion of the substrate 402 that underlies the tantalum thin film 406 is also in a state of residual mechanical stress along lines parallel to the upper surface 404. The magnitude of the residual stress in the tantalum thin film 406 is different than the magnitude of the residual stress in the underlying portion of the substrate 402. The tantalum thin film 406 is continuously bonded to the upper substrate surface 404 by the deposition process to form a seamless body. The continuous bonding eliminates or effectively limits creep which might otherwise allow layers to slip relative to one another and relieve the residual stress difference. The differing residual stresses remain in both the substrate 402 and the tantalum thin film.

The substrate 402 is micromachined to form a cavity 408 in the substrate 402 that underlies a portion of the tantalum thin film 406. An alumina layer 410 is left under the tantalum thin film 406. In a preferred embodiment, the alumina layer 410 has a thickness of 0.5 micrometer.

FIG. 6 illustrates a front cross-sectional view and FIG. 7 illustrates a side cross-sectional view of the sensing contact probe 450 at a second stage of manufacture that is subsequent to the first stage of manufacture.

In FIGS. 6–7, the alumina layer 410 is selectively removed in areas surrounding the tantalum thin film 406, leaving an alumina beam layer 452 that underlies a tantalum beam layer 454. The selective removal can be completed by etching or other known MEMS shaping methods. The alumina beam layer 452 and the tantalum beam layer 454 together comprise a bent beam body 456. The bent beam body 456 extends from a probe tip face 460 to a beam support 462, which is part of the substrate 402.

Differing residual stresses in the alumina beam layer 452 and in the tantalum beam layer 454 cause the beam body 456 to bend. The probe tip face 460 bends through an angle θ. The angle θ is in excess of 45 degrees, and preferably near about 90 degrees and near a desired angular direction. The probe tip 460 is at a Cartesian position X, Z where it is near a desired position. It is found, however, that the Cartesian position and angular direction can vary due to variations in process parameters such as beam thicknesses. There is a desire to make fine adjustments to the Cartesian position and the angular direction of the probe tip face in order to obtain a desired angular direction, a desired Cartesian position, or both.

A stress relieved region S2 is formed in the beam body 456. The stress relieved region S2 has a stress relief property that is adjustable in order to adjust the position and angular direction of the probe tip face 460 to desired values. The stress relief property preferably comprises a mechanical weakening of the stress relieved region. The mechanical weakening can comprise permanent weakening due to laser ablation or chemical etching. The mechanical weakening can alternatively comprise weakening from heating during laser-induced plastic flow. After cooling, the material regains it strength in a different shape, and the stress field has changed.

The location of the stress relieved region can be selected to be at different locations such as S1, S2, S3 along the length S of the beam body 456. The location selected controls the relative amounts of deflection adjustment in the X, Z. The location selected also affects the relative amounts of change in Z, θ. This adjustment is particularly useful in adjusting selected sensing contact probes in an array of multiple sensing contact probes (such as illustrated in FIGS. 2–3) so that there is a uniform positioning in an array of contacts (affected by X adjustment) and a uniform amount of preload (affected by Z adjustment). In a preferred embodiment, the beam body 456 has a thickness of 1 micrometer, a width of 25 micrometers and a length of 75 micrometers. Typical initial stresses in the tantalum are on the order of 100 M Pascals, and typical initial stresses in the alumina beam layer 452 are on the order of 1 G Pascals. Stress relieved regions typically have a groove width of 1 micrometer and a groove depth of 0.25 micrometer. Adjustments provide changes in Z in the range of 0 to 1 micron.

The alumina beam layer 452 comprises an electrical insulation layer and the tantalum beam layer 454 comprises a metal layer that provides an electrical connection to the probe tip face 460.

In a preferred arrangement, the probe tip face 460 is a first one of a row of multiple probe tip faces suspended from a probe support that is common to the row of probe tip faces. The adjustment of the first probe tip face 460 brings the first probe tip face 460 into improved alignment with the remaining multiple probe tip faces. In a preferred arrangement, the sensing contact probe 450 further comprises a ferroelectric storage medium with a storage medium surface (such as surface 216 in FIG. 3), and multiple probe tip faces contact the ferroelectric storage medium surface 216 to provide multiple electrical contacts to the surface 216.

The probe tip face 460 can alternatively comprise a magnetic head for scanning magnetic media, or a mechanical contact sensor for sensing contact with a surface.

FIGS. 4–7 illustrate a method of manufacturing an array of sensor contact probes. A first layer 452 has a first surface 404 and a second layer 454 has a second surface 462 bonded to the first surface 404. The first layer 452 and the second layer 454 have differing internal stresses. The first and second layers 452, 454 are shaped to define an array of beams having first beam ends 462 that are supported by the first layer, and having second beam ends that include an array of probe tip faces 460. The array of beams bend from the differing internal stresses to provide positions and angular directions of the probe tip faces 460. A stress relief region is provided that has a stress relief property on at least one beam in the array of beams. The stress relief property is adjusted to adjust the position and angular direction of a probe tip face on the at least one beam.

Figure 8:
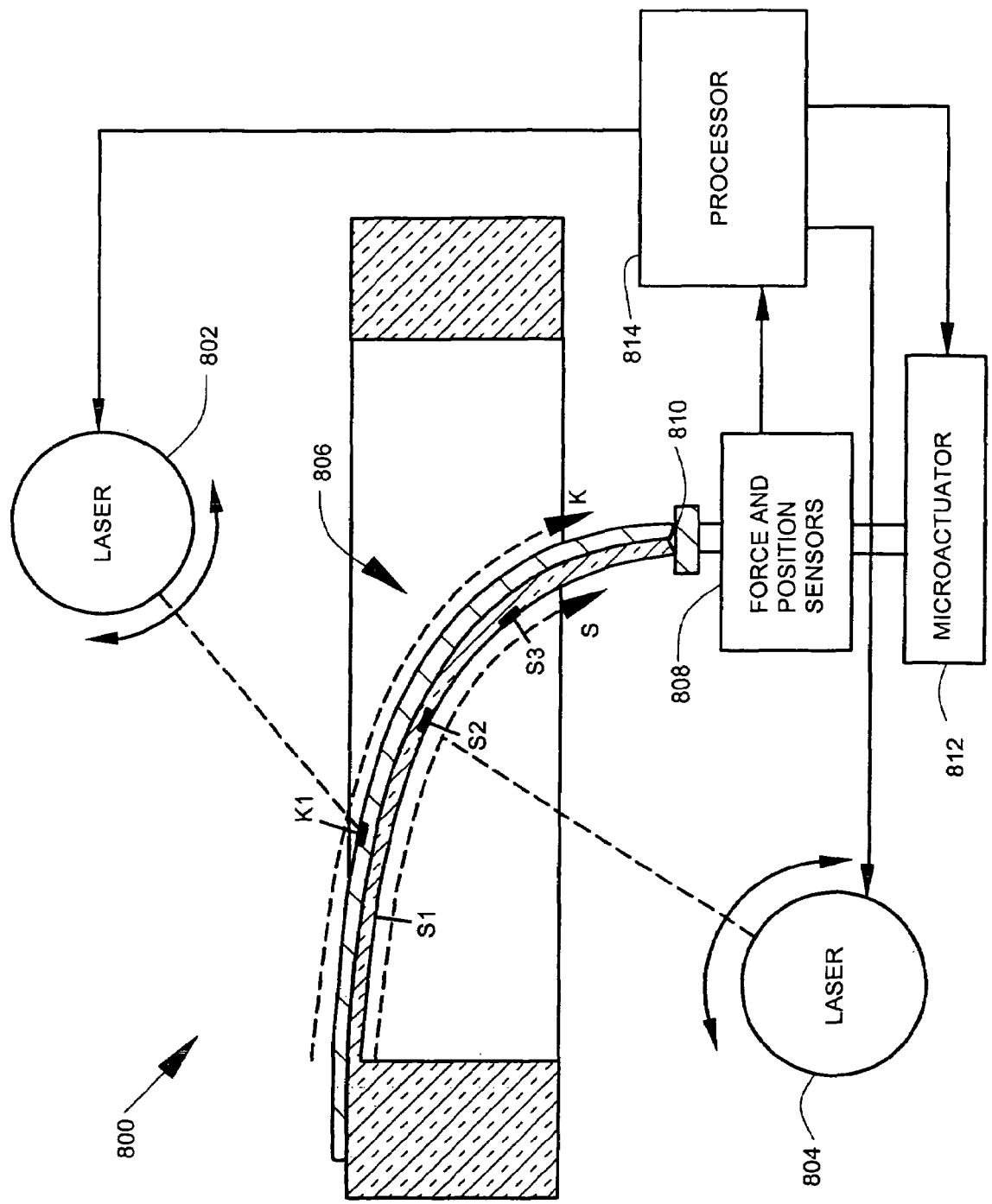
FIG. 8 illustrates a manufacturing fixture for adjusting sensing contact probes.

FIG. 8 illustrates an adjustment fixture 800 that can be used to adjust a stress property in a bent beam body 806 using a laser. Adjustment fixture 800 comprises lasers 802, 804 that can be adjustably directed at bent beam body 806. Stress relief region K1 can be formed by the laser 802 along a length K on an upper surface of the bent beam body 806. Stress relief regions S1, S2, S3 can be formed by the laser 804 along a length S of the bent beam body 806. Intensity and duration of laser pulses from lasers 802, 804 can be set to provide either laser ablation or laser induced plastic flow of the stress relief regions. A force and position sensor 808 sensing force and position at a probe tip face 810. The force and position sensor 808 is positioned by a microactuator 812. A processor 814 controls the microactuator 812 and the direction, intensity and duration of lasers 802, 804. In operation, the adjustment fixture senses an initial force and position of the probe tip face 810. If the force or position are incorrect, the processor 814 calculates an adjustment using one or both of lasers 802, 804. After an adjustment is made, the force and position are sensed again, and a second adjustment can be made as needed to bring the force and position to desired magnitudes. After completion of adjustment of one bent beam body in an array, the fixture can move to a second bent beam body in the array that requires adjustment. An entire array can be brought into adjustment for proper contact with a surface to be scanned.

Figure 9:
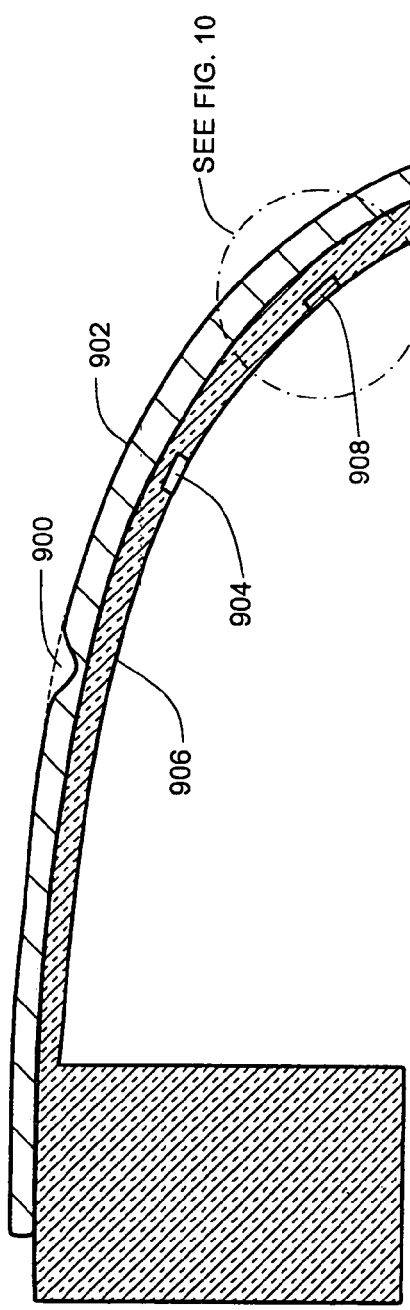
FIGS. 9–10 illustrate examples of stress relief regions in sensing contact probes.

FIG. 9 schematically illustrates various examples of multiple types of stress relief regions. Stress relief region 900 comprises a laser ablated region in a channel 902. Stress relief region 904 comprises a slot that is chemically etched into an insulating substrate layer 906. Stress relief region 908 comprises a laser induced plastic flow region in substrate layer 906.

Figure 10:
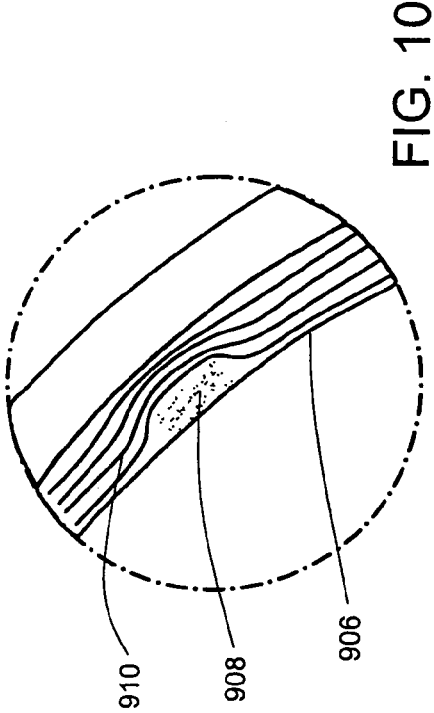

FIG. 10 illustrates an enlarged view of the stress relief region 908 in FIG. 9. Region 908 has been heated to a plastic state and then cooled, and lines of stress 910 do not pass through the stress relief region 908.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the sensing contact probe while maintaining substantially the same functionality without departing from the scope and spirit of the present invention. In addition, although the preferred embodiment described herein is directed to a scanning system for ferroelectric memory, it will be appreciated by those skilled in the art that the teachings of the present invention can be applied to other mechanical scanning systems, without departing from the scope and spirit of the present invention.

What is claimed is:

1. A sensing contact probe, comprising:
    a beam support and a probe comprising a bent beam body extending from the beam support to a probe tip face spaced apart from the beam support, the probe tip face having a position and facing in an angular direction;
    the bent beam body comprising first and second beam layers with differing residual stresses that are bonded together and bend the beam body; and
    a stress relief region formed in the bent beam body, the stress relief region having an adjusted stress property adjusting the bending to control the probe tip face position and angular direction.

2. The sensing contact probe of claim 1 wherein the stress relief region is selected from the group: laser ablated region, laser-induced plastic flow region and chemically etched region.

3. The sensing contact probe of claim 1 wherein the first beam layer comprises an electrical insulation layer and the second beam layer comprises a metal layer that provides an electrical connection to the probe tip face.

4. The sensing contact probe of claim 1 wherein the first beam layer comprises alumina and the second beam layer comprises tantalum.

5. The sensing contact probe of claim 1 wherein the probe tip face is first one of a row of multiple probe tip faces suspended from a probe support that is common to the row of probe tip faces, the adjustment of the first probe tip face bringing the first probe tip face into improved alignment with the remaining multiple probe tip faces.

6. The sensing contact probe of claim 5 and further comprising a ferroelectric memory array with an array surface, and wherein the multiple probe tip faces contact the ferroelectric memory surface to provide multiple electrical contacts to the array surface.

7. The sensing contact probe of claim 1 wherein the beam comprises an optical waveguide that communicates radiation to the probe tip face.

8. The sensing contact probe of claim 1 wherein the probe tip face comprises a magnetic head.

9. The sensing contact probe of claim 1 wherein the probe tip face comprises a mechanical contact sensor.

10. The sensing contact probe of claim 1 wherein the probe support and the first beam layer comprise a seamless body of material.

11. A method of manufacturing an array of sensor contact probes, the method comprising:
providing a first layer having a first surface and providing a second layer having a second surface bonded to the first surface, the first and second layers having differing internal stresses;
shaping the first and second layers to define an array of beams having first beam ends that are supported by the first layer, and having second beam ends that include an array of probe tip faces, the array of beams bending from the differing internal stresses to provide positions and angular directions of the probe tip faces; and
providing a stress relief region that has a stress relief property on at least one beam in the array of beams and adjusting the stress relief property to adjust the position and angular direction of a probe tip face on the at least one beam.

12. The method of claim 11 wherein the adjusting of the stress relief property comprises an adjustment process selected from the group of: laser ablation, laser-induced plastic flow and chemical etching.

13. The method of claim 11 further comprising:
forming the first layer from an electrically insulating material; and
forming the second layer from a metal layer that provides an electrical connection to the probe tip.

14. The method of claim 11 wherein the adjusting brings the one probe tip face into improved alignment with the other probe tip faces in the array.

15. The method of claim 11 and further comprising:
contacting a ferromagnetic memory array with the probe tip faces.

16. The method of claim 15 and further comprising:
moving the ferromagnetic memory array relative to the probe tip faces to provide scanning of the ferromagnetic memory array.

17. A sensing contact probe, comprising:
a probe support and a probe comprising a bent beam body extending from the beam support to a probe tip face spaced apart from the beam support, the probe tip face having a position and facing in an angular direction; the beam body comprising first and second beam layers bonded together and having differing residual stresses that bend the beam body; and
stress relief means formed in the bent beam, the stress relief means adjusting the bending to control the probe tip face position and angular direction.

18. The sensing contact probe of claim 17 wherein the stress relief region is selected from the group: laser ablated region, laser-induced plastic flow region and chemically etched region.

19. The sensing contact probe of claim 17 wherein the first beam layer comprises an electrical insulation layer and the second beam layer comprises a metal layer that provides an electrical connection to the probe tip face.

20. The sensing contact probe of claim 17 wherein the first beam layer comprises alumina and the second beam layer comprises tantalum.

* * * * *